United States Patent [19]
Owen, Jr.

[11] 3,825,133
[45] July 23, 1974

[54] PIVOTABLE REFUSE CART DUMPING APPARATUS WITH HORIZONTALLY MOVABLE AND SPREADABLE ARMS

[76] Inventor: Thomas G. Owen, Jr., R.R. 7 Box 250, Bloomington, Ind. 47401

[22] Filed: Dec. 26, 1972

[21] Appl. No.: 318,221

Related U.S. Application Data

[62] Division of Ser. No. 203,815, Dec. 1, 1971, Pat. No. 3,790,011.

[52] U.S. Cl............................ 214/148, 214/147 G
[51] Int. Cl............................................. B66c 23/00
[58] Field of Search..... 214/132, 141, 146.5, 147 T, 214/147 G, 148, 302, 313, 1 BD, 77 R, 768; 294/95, 106, 116

[56] References Cited
UNITED STATES PATENTS

| | | | |
|---|---|---|---|
| 1,858,642 | 5/1932 | Ross | 214/147 T |
| 2,020,231 | 11/1935 | Bell | 214/302 |
| 3,122,250 | 2/1964 | French et al. | 214/731 |
| 3,180,512 | 4/1965 | Moss | 294/116 |

Primary Examiner—Robert J. Spar
Assistant Examiner—Lawrence J. Oresky
Attorney, Agent, or Firm—Woodard, Weikart, Emhardt & Naughton

[57] ABSTRACT

A dumping apparatus having a pair of arms mounted to a truck for engaging a refuse cart. The arms are pivotally mounted to a beam which is slidable horizontally to and from the truck by a cylinder motor. The beam is mounted to a pair of channels which are slidably mounted to a second pair of channels fixedly attached to the truck. The cylinder motor is attached to the truck and has a piston rod connected to the beam. A second cylinder motor mounted to the truck has an extendable piston rod connected to a lever which is fixedly connected to a shaft upon which the arms are hingedly mounted. A pair of cam plates mounted to the truck receive cam followers rotatably mounted to the arms which are urged against the cam plates by a pair of springs. The cam plates diverge and extend beneath the arms thereby allowing the arms to spread apart as they are pivoted downward past the horizontal position. A pair of slotted hands are mounted to the ends of the arms for receiving handles mounted to the refuse cart. The handles are slidable through the slots so as to achieve a shaking motion of the cart.

1 Claim, 7 Drawing Figures

PATENTED JUL 23 1974 3,825,133

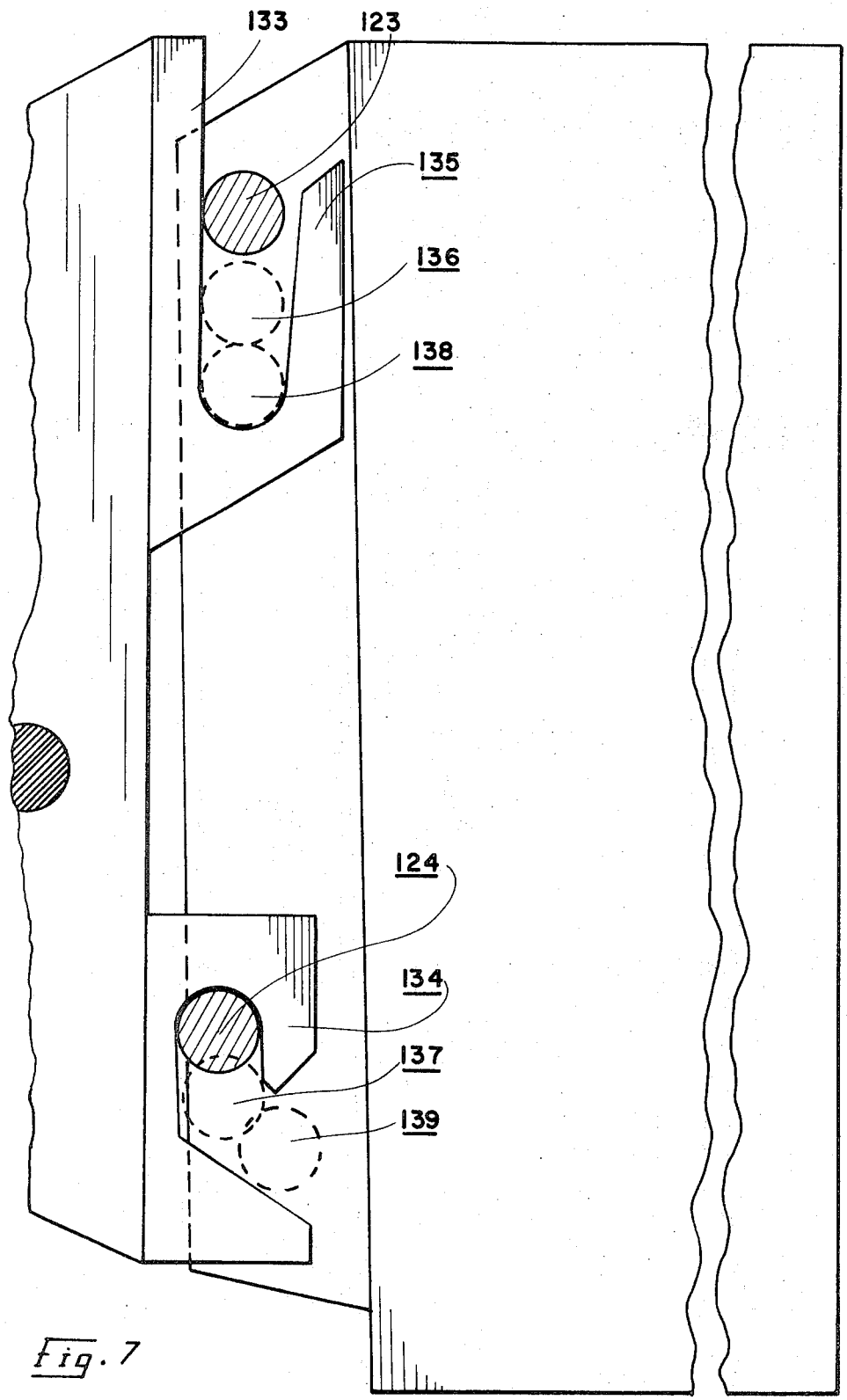

PIVOTABLE REFUSE CART DUMPING APPARATUS WITH HORIZONTALLY MOVABLE AND SPREADABLE ARMS

REFERENCE TO RELATED APPLICATIONS

This application is a division of application Ser. No. 203,815 filed Dec. 1, 1971, now U.S. Pat. No. 3,790,011 which issued Feb. 5, 1974.

BACKGROUND OF THE INVENTION

1. Field of the Invention

This invention is in the field of dumping devices.

2. Description of the Prior Art

In my U.S. patent application, Ser. No. 23,916, filed Mar. 30, 1970 now U.S. Pat. No. 3,658,199 issued Apr. 25, 1972 and entitled REFUSE CART AND DUMPING APPARATUS, I have disclosed a dumping apparatus which has a pair of arms mounted to a shaft. The refuse cart disclosed therein has a pair of handles engageable with the arms and also has a pair of projections engageable with the shaft so as to facilitate the alignment of the cart with respect to the dumping apparatus. Disclosed herein, is a new and improved dumping apparatus wherein the arms may be moved to and from the truck so as to allow the operator to engage and lift a cart positioned at a substantial distance from the truck. In addition, the apparatus disclosed herein has arms which may be spread apart so as to allow the arms to be quickly and easily positioned on the opposite sides of the cart. Subsequent upward movement of the arms result in the arms closing in on the sides of the cart thereby engaging the handles. Also disclosed herein are a pair of hands mounted to the arms which are slotted so as to allow relative motion of the cart handles with respect to the hands to achieve a shaking motion of the cart.

SUMMARY OF THE INVENTION

One embodiment of the present invention is a material dumping arrangement having a cart for receiving and holding material with the cart having a first handle, a first arm having a hand engageable with the handle, first means on a truck pivotally mounting the arm to the truck, wherein the improvement comprises second means on the truck operable to horizontally move the arm to and from the truck to allow the hand to reach the handle.

Another embodiment of the present invention is a dumping apparatus comprising a first arm having a hand, first means on a truck pivotally mounting the arm to the truck, a second arm with a hand pivotally mounted by the first means to the truck, and second means connected to the first arm and the second arm and operable to controllably move the first and second arms apart for varying the distance between the first arm hand and the second arm hand.

Yet another embodiment of the present invention is a material dumping arrangement comprising a cart having a side wall with a pair of spaced apart handles mounted thereon, each of the handles having a top rod and a parallel bottom rod spaced from the side wall, and, a pick-up apparatus having a pair of spaced apart brackets alignable with the handles, each of the brackets has a top portion with an upwardly extending finger defining a slot for receiving the top rod and a bottom portion with a downwardly extending finger mounted thereon defining a slot for receiving the bottom rod.

It is an object of the present invention to provide a new and improved material dumping arrangement.

Yet another object of the present invention is to provide a dumping apparatus which has a pair of spreadable arms.

It is the further object of the present invention to provide a dumping apparatus having a pair of arms which are horizontally movable to and from the truck to which the arms are mounted.

In addition to the above objects, it is an object of the present invention to provide a dumping apparatus having a pair of arms with hands for receiving a refuse cart in such a manner that the cart may be shaken to loosen the contents therein.

Related objects and advantages of the present invention will be apparent from the following description.

BRIEF DESCRIPTION OF THE DRAWINGS

FIG. 7 is an end view of the dumping arrangement of FIG. 6 showing the dumping apparatus engaged with the refuse cart.

DESCRIPTION OF THE PREFERRED EMBODIMENTS

Figure 1:
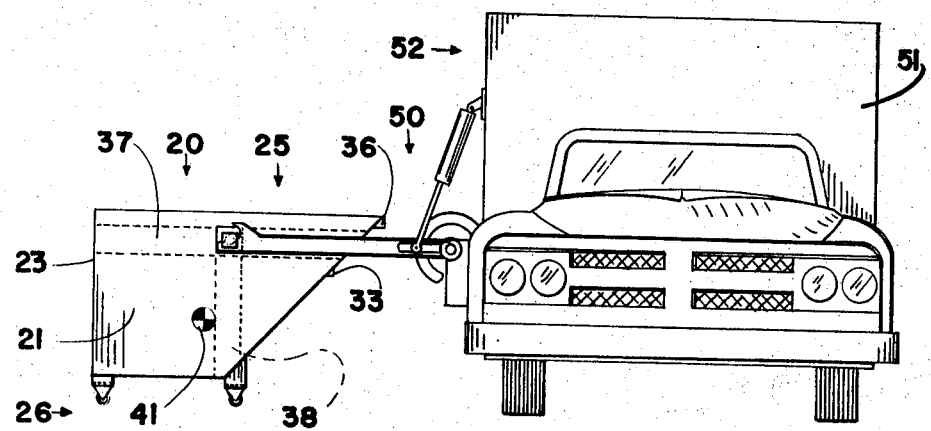
FIG. 1 is a front view of a truck having a dumping apparatus positioned immediately adjacent a refuse cart.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
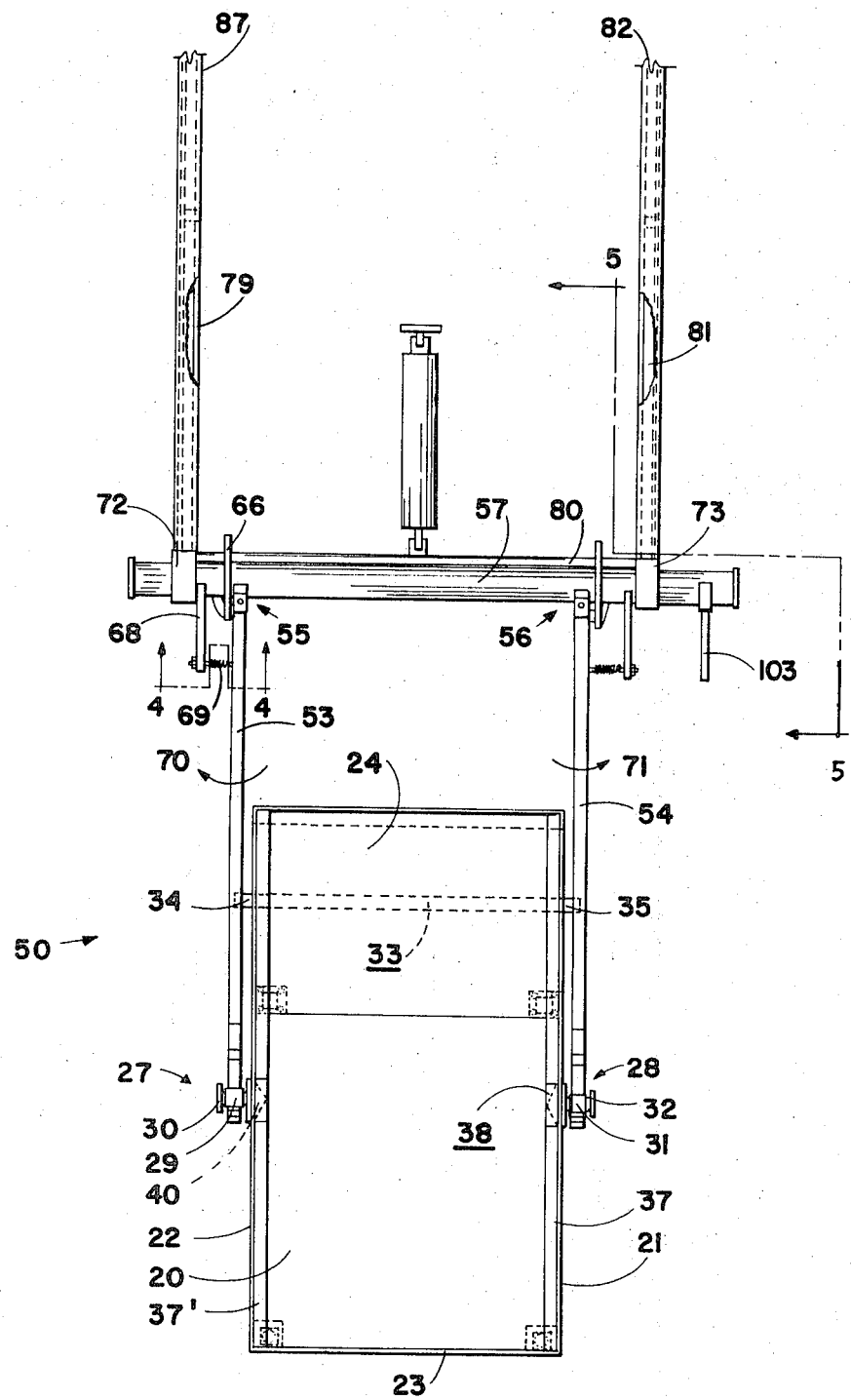
FIG. 3 is a fragmentary enlarged top view of the cart attached to the lifting arms.

Referring now more particularly to FIG. 1, there is shown a truck 51 having a pick-up apparatus 50 mounted thereon for engaging and lifting cart 20. Dumping apparatus 50 has a pair of pivotable arms which also are horizontally movable and spreadable so as to facilitate the engaging and lifting of cart 20. A side view of the cart is shown in FIG. 1 whereas a top view of the cart is shown in FIG. 3.

Cart 20 has a pair of side walls 21 and 22 integrally joined to end walls 23 and 24. The bottom of the cart is closed whereas the top of the cart is provided with an opening 25 through which refuse may be placed into the cart or dumped from the cart. Walls 21 through 23 are vertical whereas wall 24 slants obliquely upward. The cart is provided with a wheel 26 rotatably mounted thereto at each of the lower corners thereby allowing the cart to be readily moved across a horizontal surface. Handles 27 and 28 are mounted respectively to walls 22 and 21. The handles may be secured to the side walls by welding or other suitable fastening means. A cylindrical rod 29 is provided on handle 27 with an end cap 30 being mounted to the outer end of the rod. Likewise, handle 28 is provided with a cylindrical rod 31 which has an end cap 32 mounted to its outer end. An angle arm 33 is fixedly mounted to end wall 24 and extends outwardly of side walls 21 and 22 forming protrusions 34 and 35. A second angle arm 36 is mounted to the upper end of wall 24 extending across the width of the cart. Strengthening ribs are mounted within the cart and are secured to handles 27 and 28 to increase the structural rigidity of the cart. For example, vertical ribs 38 and 40 are fastened respectively to the interior surface of walls 21 and 22 with handles 28 and 27 being respectively attached thereto. Likewise, a pair of horizontally extending strengthening ribs 37' and 37 are respectively attached to the interior surface of side walls 21 and 22 with handles 28 and 27 being respectively attached thereto. The strengthening ribs may be welded to the interior surface of the side walls. The center of gravity 41 of the cart is shown in FIG. 1. The center of gravity is located between end wall 23 and handles 27 and 28. Thus, the handles are always positioned between the center of gravity and angle arm 36.

Figure 4:
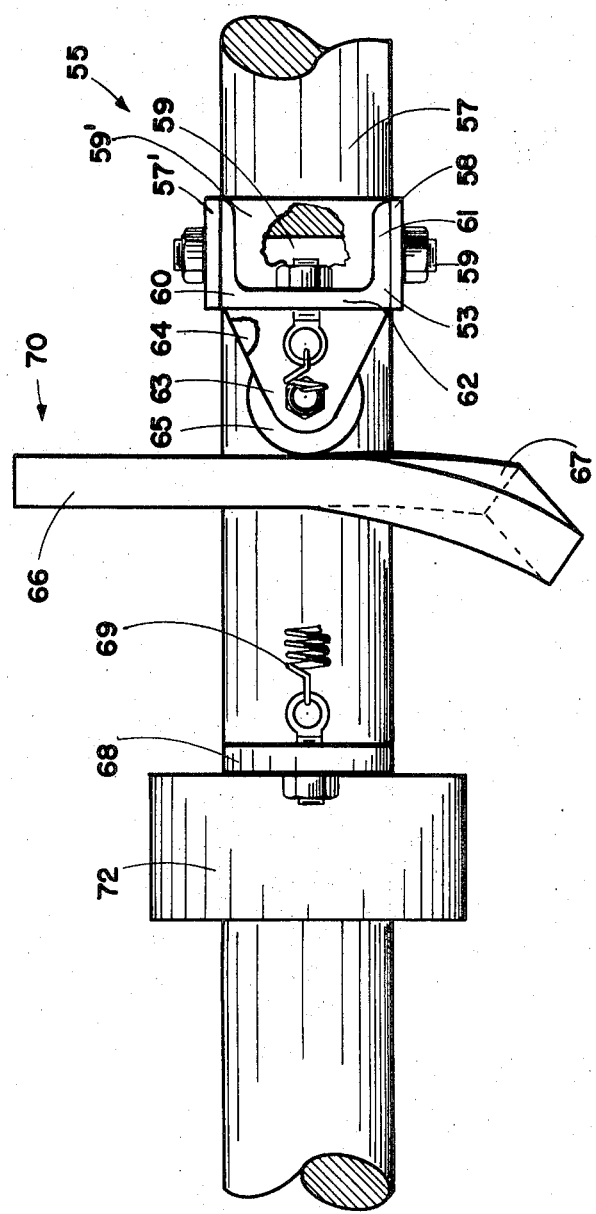
FIG. 4 is a fragmentary enlarged cross sectional view taken along line 4—4 of FIG. 3 and viewed in the direction of the arrows.
Figure 5:
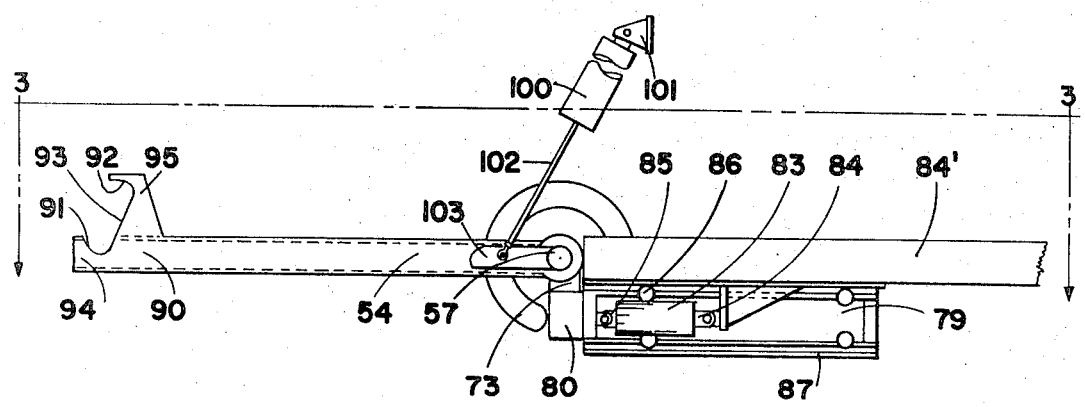
FIG. 5 is a fragmentary side sectional view of arm 54 taken along the line 5—5 of FIG. 3 and viewed in the direction of the arrows.

Dumping apparatus 50 is pivotally connected to truck 51 which is provided with an opening through the side wall 52 of the truck to receive the refuse from the cart as the cart is pivoted upwardly to the side wall. The invention disclosed herein is shown and discussed in terms of the truck having a side opening; however, it is understood that the invention is operable equally well with a truck having the conventional rear opening. The truck is fragmented in FIG. 2 to illustrate the mounting of the dumping apparatus. A top view of the dumping apparatus is shown in FIG. 3. The dumping apparatus has a pair of parallel arms 53 and 54 which are pivotally mounted by identical brackets 55 and 56 to shaft 57. Bracket 55 (FIG. 4) has a top wall 57' and a bottom wall 58 fixedly mounted to shaft 57 by welds. A vertical block 59' is secured between walls 57' and 58 to rigidify the bracket. Arm 53 has a C-shaped configuration with the top and bottom walls of the arm being positioned inwardly of walls 57' and 58. Top wall 60 of arm 53 is positioned adjacent wall 57' whereas bottom wall 61 is positioned adjacent wall 58. Fastening device 59 extends through walls 57', 58, 60 and 61 securing the arm to the bracket. Fixedly mounted to wall 62 of arm 53 are a pair of brackets 63 and 64 which have a wheel 65 rotatably mounted thereto. Wheel 65 contacts cam surface 67 of cam 66 at all times being urged against the surface by helical spring 69 having its opposite ends fastened to arm 53 and an outwardly projecting wall 68 welded to shaft 57. Cam 66 is fixedly mounted to beam 80 (FIG. 5) and extends around shaft 57 being perpendicular to shaft 57 and parallel with arm 53 when the arm is in the most vertical position and when the arm is in a level horizontal position. Cam 66 is perpendicular to shaft 57 at all locations except below the outwardly extending horizontal arm. Thus, when arm 53 extends down beyond the horizontal position, spring 69 will force the arm to pivot in the direction of arrow 70 about fastener 59 with wheel 65 following surface 67 of the cam. Arm 54 is mounted in a manner identical to the mounting of arm 53 with the exception that arm 54 is pivotable in the direction of arrow 71 with a similar rotatable wheel and cam identical to wheel 65 and cam 66 being provided for arm 54. Thus, to spread arms 53 and 54, the arms are pivoted down past the horizontal with the springs urging the arms apart in a diverging manner. As the arms are brought upwardly past the horizontal position, the arms will converge to a parallel position. The distance between the hands mounted to the outer ends of arms 53 and 54 is thereby varied.

Figure 2:
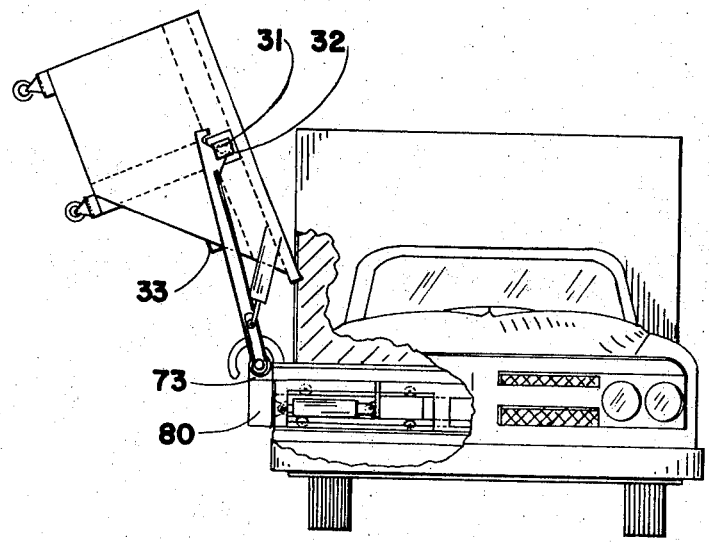
FIG. 2 is the same view as FIG. 1 only with the front portion of the truck fragmented to more clearly show the dumping apparatus and with the arms shown lifting the refuse cart.

Arms 53 and 54 (FIG. 3) are mounted respectively to brackets 55 and 56 which are fixedly mounted to shaft 57. The shaft is received by a pair of bearings 72 and 73 which are mounted atop beam 80 (FIG. 2). Thus, the shaft may rotate atop beam 80 which is also movable horizontally to and from the truck. A lever 103 (FIG. 5) is fixedly mounted to the end of shaft 57 and is connected to piston rod 102 of hydraulic cylinder motor 100. Cylinder motor 100 is mounted by bracket 101 to the truck. Retraction of the piston rod results in the pivoting of the arms upwardly so as to lift the refuse cart whereas extension of the piston rod results in the downward pivoting of the dumping apparatus arms. The piston rod may be extended sufficiently so as to pivot the arms at least 20° below the horizontal position. Cylinder motor 100 is pivotally mounted to bracket 101 with the end of the piston rod 102 also being pivotally mounted to lever 103. Thus, upon complete retraction of the piston rod into the cylinder motor, the cylinder motor and piston rod will swing to a vertical position so as to allow the positioning of the refuse cart immediately adjacent the opening in the side of the truck.

Beam 80 is fixedly mounted at either end to horizontally extending beams 79 and 81. Beams 79 and 81 are slidably mounted to a second pair of beams 82 and 87 which are fixedly attached to the truck. Beam 81 is slidably mounted to beam 82 (FIG. 2) whereas beam 79 is slidably mounted to beam 87. Beam 79 and beam 81 are each provided with a plurality of roller bearings which bearingly receive beams 82 and 87. For example, bearings 86 (FIG. 5) are rotatably mounted to beam 79 which is slidable in beam 87. A hydraulic cylinder motor 83 is fixedly mounted by bracket 84 to the truck frame 84' and has an extendable piston rod 85 which has an outer end connected to beam 80. By extending piston rod 85 from cylinder motor 83, beam 80 and shaft 57 are caused to move horizontally outward from the truck so as to position the dumping apparatus arms adjacent to the refuse cart. The arms may be then pivoted downward so as to be spread in a diverging manner until the ends of the arms are positioned adjacent the side walls of the refuse cart. The arms are then pivoted upward and piston rod 85 is withdrawn into the cylinder motor until beam 80 and shaft 57 are positioned adjacent to the truck. Continued upward pivoting of the dumping apparatus arms will result in the positioning and tilting of the refuse cart adjacent to the truck side opening thereby emptying the contents of the cart into the truck.

An identical hand is formed at the end of each lifting arm 53 and 54. For example, hand 90 (FIG. 5) is formed on arm 54. Hand 90 has a pair of fingers 94 and 95 spaced apart by a flat surface 93. The fingers curve so as to form recesses 91 and 92 for receiving cylindrical rod 31 of handle 28. When the handles are first engaged by the hands, the cylindrical rod portion of the handles are positioned in the lower recess of each hand. For example, the cylindrical rod portion of handle 28 would be positioned in recess 91 of hand 90. As the arms are pivoted upward by cylinder motor 100, the cylindrical rod portion of each handle remain in the lower recess until angle arm 36 (FIG. 1) contacts the side of the truck as shown in FIG. 2. During the lifting of the cart, angle arm 33 projects below and contacts continuously the lifting arms. The center of gravity is positioned between the handle arms and wall 23 therefore providing for the stability of the refuse cart as it is lifted and keeping the cylindrical rod portion of each handle in the lower recess (for example, recess 91). When angle arm 36 contacts the side wall of the truck, the cylindrical rod portion of each handle will slide across the flat surface of each hand to the opposite recess. For example, the cylindrical rod portion of handle 28 will slide across surface 93 from recess 91 to recess 92. At this time, angle arm 33 will pivot away from the lifting arm whereas angle arm 36 will remain in contact with the truck. Continued upward pivoting of the arms will result in the top opening 25 of the refuse cart being positioned adjacent the side opening of the truck. The slanted end wall 24 will facilitate the emptying of the refuse from the cart into the truck. In certain instances, the contents of the cart may become lodged so as to require the operator to pivot the arms downward until the cylindrical rod portions slide from one handle recess to the opposite handle recess, for example, arm 54 would be pivoted downward until the cylindrical rod portion of handle 28 moves from recess 92 to recess 91. Immediately thereafter, the arm may be pivoted upward again so as to move the cylindrical rod portion to the opposite recess therefore achieving a shaking of the refuse cart to dislodge the contents therefrom and facilitate the movement of the refuse to the truck.

Figure 6:
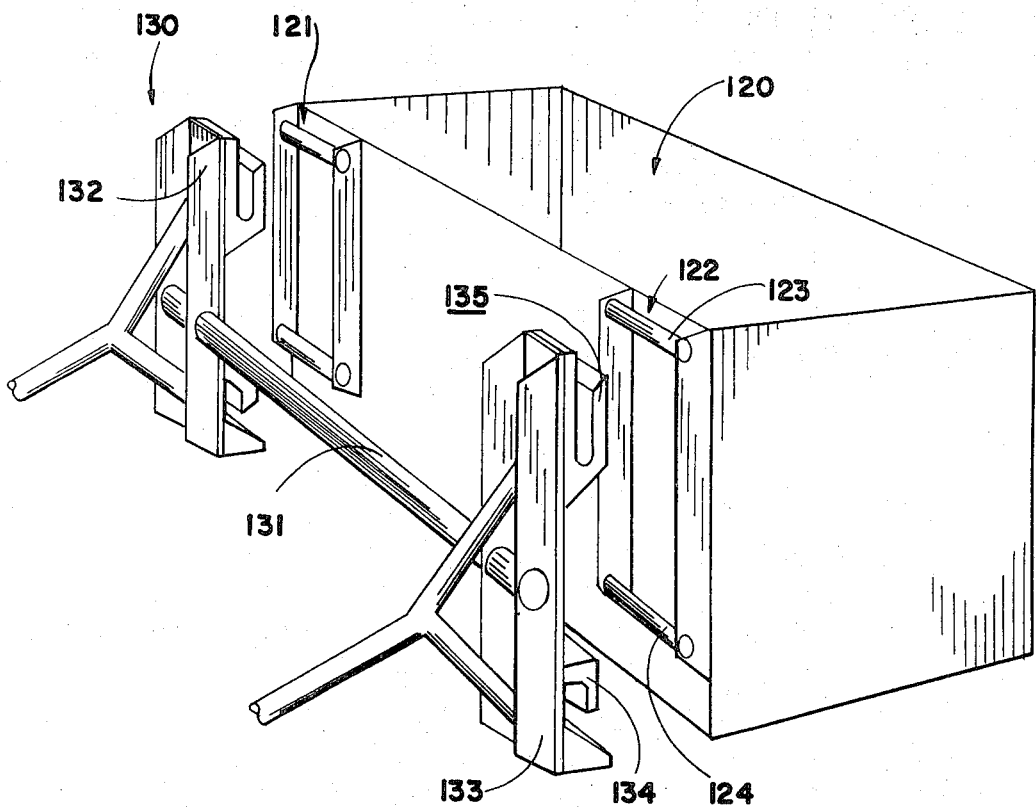
FIG. 6 is a fragmentary view of an alternate dumping arrangement incorporating the present invention.

An alternate embodiment of the lifting apparatus is shown in FIG. 6 and is designed to be attached to the lifting arms of the dumping truck. Cart 120 is provided with identical handles 121 and 122. Each handle has an upper rod 123 and a lower rod 124 spaced apart from the side wall of the cart so as to engage the lifting portions of the dumping apparatus. Dumping apparatus 130 has a horizontally extending rod 131 connected to brackets 132 and 133. Bracket 133 will now be described it being understood that an identical description applies to bracket 132. An upwardly curved finger 135 is fixedly mounted to bracket 133 and is positioned thereon so as to engage rod 123. A downwardly curved finger 134 is fixedly mounted to the lower end of bracket 133 and is spaced apart from finger 135 so as to be aligned with rod 124 when finger 135 is aligned with rod 122. FIG. 7 is a fragmentary side view of bracket 133 engaged with the cart. Initially, rod 123 is positioned in the top portion of the recess formed by finger 135 as shown by the solid representation of rod 123. Simultaneously, rod 124 is positioned into the slot formed by the lower finger 134. As the lifting arms are lifted and brackets 132 and 133 are moved upwardly, rod 123 will move to position 136 whereas rod 124 will move to the position indicated by position 137. Continued lifting of the lifting arms results in rod 123 assuming position 138 and rod 124 assuming position 139. Rod 131 and brackets 132 and 133 may be mounted to the ends of the lifting arms by any number of standard fastening means.

The apparatus shown in FIGS. 6 and 7 may be easily mounted to conventional dumping trucks and carts. As rod 124 moves from position 139 to the opposite end of the slot formed by finger 134, the cart will be shaken thereby loosening the contents. The lifting apparatus in FIG. 6 may also be utilized to engage a smaller cart which holds a conventional cylindrical trash can.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. An apparatus comprising:
   a frame;
   a first arm having a hand;
   first means on said frame pivotally mounting said arm about a pivot axis to said frame;
   a second arm with a hand pivotally mounted about said pivot axis by said first means to said frame, said hand of said first arm and said hand of said second arm each have an inclined and bounded surface;
   second means connected to said first arm and said second arm and operable to controllably move said first and second arms apart for varying the distance between said first arm hand and said second arm hand;
   third means including a hydraulic ram on said frame operable to horizontally move said first and second arm along with said pivot axis to and from said frame; and wherein:
   said second means includes a pair of cams mounted on said frame and a pair of rollers mounted on said first arm and said second arm with said rollers in contact with said cams, said second means further includes springs connected to said first arm and said second arm urging said rollers against said cams.

* * * * *